April 17, 1951  A. M. MILEY ET AL  2,548,995

VENT PLUG

Filed Feb. 6, 1947

INVENTORS
ALBERT M. MILEY
JOHN E. WHITE

BY

ATTORNEY

Patented Apr. 17, 1951

2,548,995

UNITED STATES PATENT OFFICE 2,548,995

VENT PLUG

Albert Milton Miley, Glenside, and John Edward White, Philadelphia, Pa., assignors to The Electric Storage Battery Company, a corporation of New Jersey Application February 6, 1947, Serial No. 726,890

2 Claims. (Cl. 136—177)

This invention relates to vent plugs for storage batteries.

An object of the invention is to provide improved vent plugs which are of inexpensive and simplified construction, and yet are particularly effective in preventing escape of liquid from battery cells.

A further object of the invention is to provide vent plugs in which improved arrangements of a chamber, communication apertures thereto and baffle means are employed to entrap vapors and splashed electrolyte that escape from battery cells and return such vapors and electrolyte to the cells.

A further object of the invention is to provide improved vent plugs having the foregoing characteristics and constructed of two sections so designed that they may be readily molded and permanently secured together to furnish a unitary plug.

A further object of the invention is to provide improved means for joining vent plug sections to insure that the sections are in proper relation to each other.

In accomplishing these and other objects of the present invention, we have provided improved details of structure, a preferred form of which is shown in the accompanying drawing, wherein.

Figure 1:
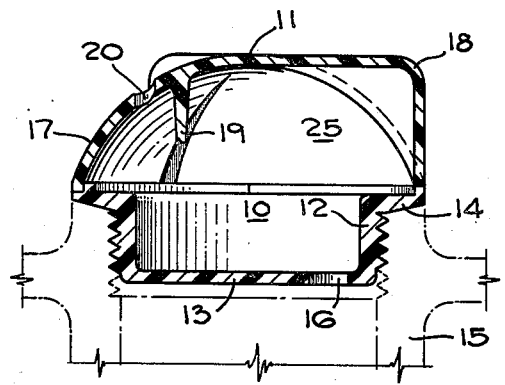
Figure 1 is a vertical sectional view of a portion of a storage battery cover and a vent plug constructed in accordance with principles of the present invention.

Referring more in detail to the drawing and with particular reference to Figure 1, it is seen that the vent plug of the present invention comprises a lower section 10 and an upper section 11. Sections 10 and 11 are preferably molded as integral pieces from a suitable plastic material resistant to battery electrolyte, of which many are known, as, for example, hard rubber and various synthetic resins.

Lower section 10 includes an annular barrel 12, a horizontal baffle 13 extending across the barrel adjacent the bottom thereof and a horizontal flange 14 extending outwardly from the circumference of said barrel adjacent the top. The exterior of the barrel is threaded or otherwise provided with fastening means to cooperate with similar fastening means in an opening in a battery cover, designated 15, to secure the vent plug thereto. Baffle 13 contains a vent aperture 16 preferably located near an edge thereof and communicating between the cell interior and the space above said baffle.

Upper section 11 includes a hollow body 17 preferably of dome-shape. The lower diameter of body 17 is such as to register with the circumference of flange 14. Said body preferably has gripping means formed thereon, and such means may conveniently include a plurality of wings 18. A vertical baffle 19 is formed in body 17 and extends laterally thereacross, preferably at one side of the horizontal center line of the body. Body 17 has a vent aperture 20 communicating between the space beneath said body and the surrounding atmosphere and located on the opposite side of baffle 19 from the horizontal center line.

It is seen that each section is of a configuration that may be readily molded by use of standard methods and apparatus. There are no portions that interfere with removal of the sections from molding apparatus.

Sections 10 and 11 are secured together at the surfaces at which the circumference of body 17 contacts the circumference of flange 14. This is preferably accomplished by cementing, but may be accomplished by any suitable mechanical securing means. The sections are joined with the vent apertures 16 and 20 in non-aligned relation, being preferably in diametrically opposed relation. Baffle 19 is disposed in a plane normal to baffle 13 and interrupts the direct line of flow between apertures 16 and 20.

Figure 3:
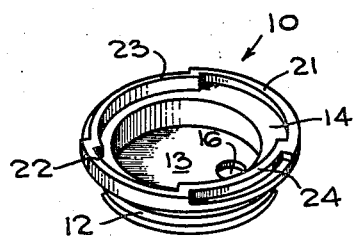
Figure 3 is a perspective view of the lower plug section, viewing it from above.

Preferably means are provided on the contacting faces of the sections to prevent joining of the sections unless the apertures are in proper relation. In the preferred embodiment such means comprise an arrangement of arcuate keys upstanding from flange 14 of lower section 10 and being of the configuration illustrated in Figure 3. Said keys include flanges 21 and 22 upstanding from the circumferential edge of flange 14 and flanges 23 and 24 upstanding from flange 14, but spaced inwardly from the circumferential edge. The arc of flange 21 is different from that of flange 22, the former being shown as greater than the latter. It is obvious, however, that the arrangement could be reversed or other designs of keys employed without departing from the invention.

Figure 2:
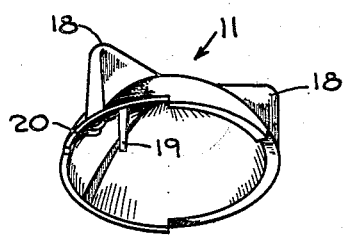
Figure 2 is a perspective view of the upper plug section, viewing it from beneath.

As shown in Figure 2, the lower edge of upper section 11 has complementary key portions designed to mate with those of the lower section. The key means interfit only when the sections are arranged with the baffles and vent apertures in proper relation and they must interfit before the sections can be secured together. Thus the key means insure that the sections are in proper relation when they are joined.

When the sections are joined as described, they define a chamber, designated 25. Gases evolved from the battery electrolyte enter chamber 25 through aperture 16 and escape therefrom through aperture 20, the baffle means and the constrictions at the apertures not appreciably interfering with passage of such gases.

When electrolyte splashes from the cell due to vibration or other causes, a small amount may enter chamber 25 through aperture 16. However, baffle 19 prevents direct escape of splashed electrolyte through aperture 20. Some water also evaporates from the electrolyte, and a portion of the vapors are entrapped or condensed as they flow around said baffle. Likewise liquid may be condensed or entrapped on the under surface of the dome of body 17. Baffle 19 prevents such liquid from creeping along said under surface to aperture 20 where it might be forced from the chamber by escaping gas. Splashed electrolyte and condensate, being prevented from escaping through aperture 20, eventually return to the cell through aperture 16.

Thus it is seen that we have provided improved vent caps of two parts joined to form a unitary construction and particularly effective in preventing loss of liquid from battery cells.

While we have shown but a single embodiment of the present invention, it is apparent that modifications may arise. Therefore we do not wish to be limited by the disclosure set forth, but only by the scope of the appended claims.

We claim:

1. A storage battery vent plug comprising lower and upper molded sections rigidly joined to form a unitary structure and defining a chamber, said lower section including an annular barrel, means on said barrel adapted to secure the vent plug in a battery well, an outwardly extending circumferential flange adjacent the edge of said barrel to which said upper section is joined, key means on said flange, and a baffle of circular outline across said barrel having an aperture adjacent an edge adapted to furnish communication between said chamber and the interior of a battery cell, said upper section including a body of dome shape having an aperture adjacent an edge remote from said first aperture adapted to furnish communication between said chamber and the surrounding atmosphere, a baffle disposed in a plane normal to said first baffle interrupting the direct line of flow between said apertures, and means on the circumferential edge of said body cooperable with said key means to insure that said apertures are in proper relation when said sections are joined.

2. A storage battery vent plug, comprising lower and upper molded sections rigidly joined to form a unitary structure and defining a chamber, said lower section including an annular barrel, means on said barrel adapted to secure the vent plug in a battery well, an outwardly extending circumferential flange adjacent the edge of said barrel to which said upper section is joined, a plurality of flanges upstanding from said circumferential flange and cooperating with similar depending flanges on the lower portion of said upper section to insure correct alignment of said upper and lower sections, a baffle plate across said barrel having an aperture adjacent an edge thereof, said upper section including a dome shaped body having an aperture therein remote from said first aperture, and baffle means depending from said dome and interposed said apertures.

ALBERT MILTON MILEY.
JOHN EDWARD WHITE.

REFERENCES CITED

The following references are of record in the file of this patent:

UNITED STATES PATENTS

| Number | Name | Date |
| --- | --- | --- |
| 1,010,695 | Sloan | Dec. 5, 1911 |
| 1,613,955 | Lesley | Jan. 11, 1927 |
| 1,999,952 | Amidon | Apr. 30, 1935 |
| 2,061,649 | Campbell | Nov. 24, 1936 |

FOREIGN PATENTS

| Number | Country | Date |
| --- | --- | --- |
| 546,943 | Great Britain | Aug. 6, 1942 |